United States Patent
Hiramaru (10) Patent No.: US 11,754,139 B2
(45) Date of Patent: Sep. 12, 2023

(54) VEHICLE SUSPENSION

(71) Applicant: HONDA MOTOR CO., LTD., Tokyo (JP)

(72) Inventor: Masayuki Hiramaru, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/696,167

(22) Filed: Mar. 16, 2022

(65) Prior Publication Data

US 2022/0316545 A1 Oct. 6, 2022

(30) Foreign Application Priority Data

Mar. 31, 2021 (JP) .................................. 2021-061802

(51) Int. Cl.
*F16F 9/44* (2006.01)

(52) U.S. Cl.
CPC .................................... *F16F 9/443* (2013.01)

(58) Field of Classification Search
CPC .............................. F16F 9/443; B60G 15/063
See application file for complete search history.

(56) References Cited

U.S. PATENT DOCUMENTS 3,877,687 A * 4/1975 Sarti ..................... B60G 17/021
267/195

FOREIGN PATENT DOCUMENTS

| CN | 110696582 A | 1/2020 | |
|---|---|---|---|
| DE | 3730177 A1 * | 3/1989 | |
| DE | 102014203684 A1 * | 9/2015 | .......... B60G 15/063 |
| EP | 0564824 A2 * | 10/1993 | |
| GB | 2467553 A | 8/2010 | |
| JP | S48-29563 A | 4/1973 | |
| JP | 54-83754 U | 6/1979 | |
| JP | S58-30050 U | 2/1983 | |
| JP | S61-140634 A | 6/1986 | |
| JP | 62-75147 A | 4/1987 | |
| JP | H8-210414 A | 8/1996 | |
| JP | 2002-054677 | 2/2002 | |
| JP | 2007-218409 A | 8/2007 | |
| JP | 2013-2620 A | 1/2013 | |
| WO | 2013/021798 A1 | 2/2013 | |

OTHER PUBLICATIONS

Indian Office Action dated Oct. 11, 2022 issued in corresponding Indian application No. 202244016079; English translation included (5 pages).

(Continued)

*Primary Examiner* — Vishal R Sahni
(74) *Attorney, Agent, or Firm* — Rankin, Hill & Clark LLP (57) ABSTRACT

In a vehicle suspension, a preload is adjusted by selective engagement of cam surfaces of different heights with a cam receiving part by rotation of an adjuster part, the adjuster part includes a vertical wall part erected in an axial direction of a spring from a spring receiving part and an engaging part with which a tool to rotate the adjuster part is to be engaged, and the engaging part includes a first engaging part formed by a gap between the plurality of vertical wall parts disposed separately from each other in a circumferential direction of the adjuster part and a second engaging part formed by a hole penetrating the vertical wall part.

6 Claims, 10 Drawing Sheets

(56) References Cited

OTHER PUBLICATIONS

Japanese Office Action dated Jan. 10, 2023 issued in corresponding Japanese application No. 2021-061802; English machine translation included (11 pages).
Japanese Office Action dated Jun. 6, 2023 issued in corresponding Japanese application No. 2021-061802; English machine translation included (11 pages).

* cited by examiner

VEHICLE SUSPENSION

INCORPORATION BY REFERENCE

The present application claims priority under 35 U.S.C. § 119 to Japanese Patent Application No. 2021-061802 filed on Mar. 31, 2021. The content of the application is incorporated herein by reference in its entirety.

BACKGROUND OF THE INVENTION

Field of the Invention

The present invention relates to a vehicle suspension.

Description of the Related Art

A conventional vehicle suspension is known which includes one end, another end which makes a stroke relative to the one end, a spring which is compressed between the one end and the other end and a preload adjusting mechanism capable of adjusting a preload of the spring (for example, see Japanese Patent Laid-Open No. 2002-54677). In Japanese Patent Laid-Open No. 2002-54677, the preload adjusting mechanism includes a cam receiving part provided on an outer periphery of the one end and an adjuster part rotatably fitted to the outer periphery of the one end, the adjuster part includes a ring-like spring receiving part which receives one end of the spring and a cam part provided with a plurality of cam surfaces extending from the spring receiving part toward the cam receiving part, and the preload is adjusted by selective engagement of the cam surface of a different height with the cam receiving part by rotation of the adjuster part.

In the conventional vehicle suspension described above, the preload is adjusted by rotating the adjuster part, however, space around the vehicle suspension is often narrow. Therefore, it is difficult to set a tool to operate the adjuster part to the adjuster part and preload adjusting work becomes troublesome. In addition, a structure of the adjuster part is desired to be simple.

The present invention is implemented in consideration of above-described circumstances and an object is to achieve an adjuster part which facilitates the preload adjusting work by a simple structure in a vehicle suspension.

SUMMARY OF THE INVENTION

A vehicle suspension includes one end, another end, a spring, and a preload adjusting mechanism, the other end being configured to make a stroke relative to the one end, the spring being compressed between the one end and the other end, the preload adjusting mechanism being capable of adjusting a preload of the spring, the preload adjusting mechanism including a cam receiving part and an adjuster part, the cam receiving part being provided on an outer periphery of the one end, the adjuster part being rotatably fitted to the outer periphery of the one end, the adjuster part including a spring receiving part and a cam part, the spring receiving part having a ring-like shape and being configured to receive one end of the spring, the cam part being provided with a plurality of cam surfaces extending from the spring receiving part toward the cam receiving part, the preload being adjusted by selective engagement of the cam surfaces with the cam receiving part by rotation of the adjuster part, the cam surfaces having different heights. The adjuster part includes a vertical wall part and an engaging part, the vertical wall part being erected in an axial direction of the spring from the spring receiving part, a tool to rotate the adjuster part being to be engaged with the engaging part. The engaging part includes a first engaging part and a second engaging part, the first engaging part being formed by a gap between the plurality of vertical wall parts disposed separately from each other in a circumferential direction of the adjuster part, the second engaging part being formed by a hole penetrating the vertical wall part.

In a vehicle suspension, an adjuster part which facilitates preload adjusting work can be achieved by a simple structure.

DETAILED DESCRIPTION OF THE PREFERRED EMBODIMENT

An embodiment of the present invention will be described below with reference to the drawings. Unless otherwise mentioned, directions including front-rear, left-right, and up-down mentioned in the description are the same as those directions relative to a vehicle body. Reference signs FR, UP, and LH shown in the drawings indicate a vehicle body front side, a vehicle body upper side, and a vehicle body left side, respectively.

Embodiment

Figure 1:
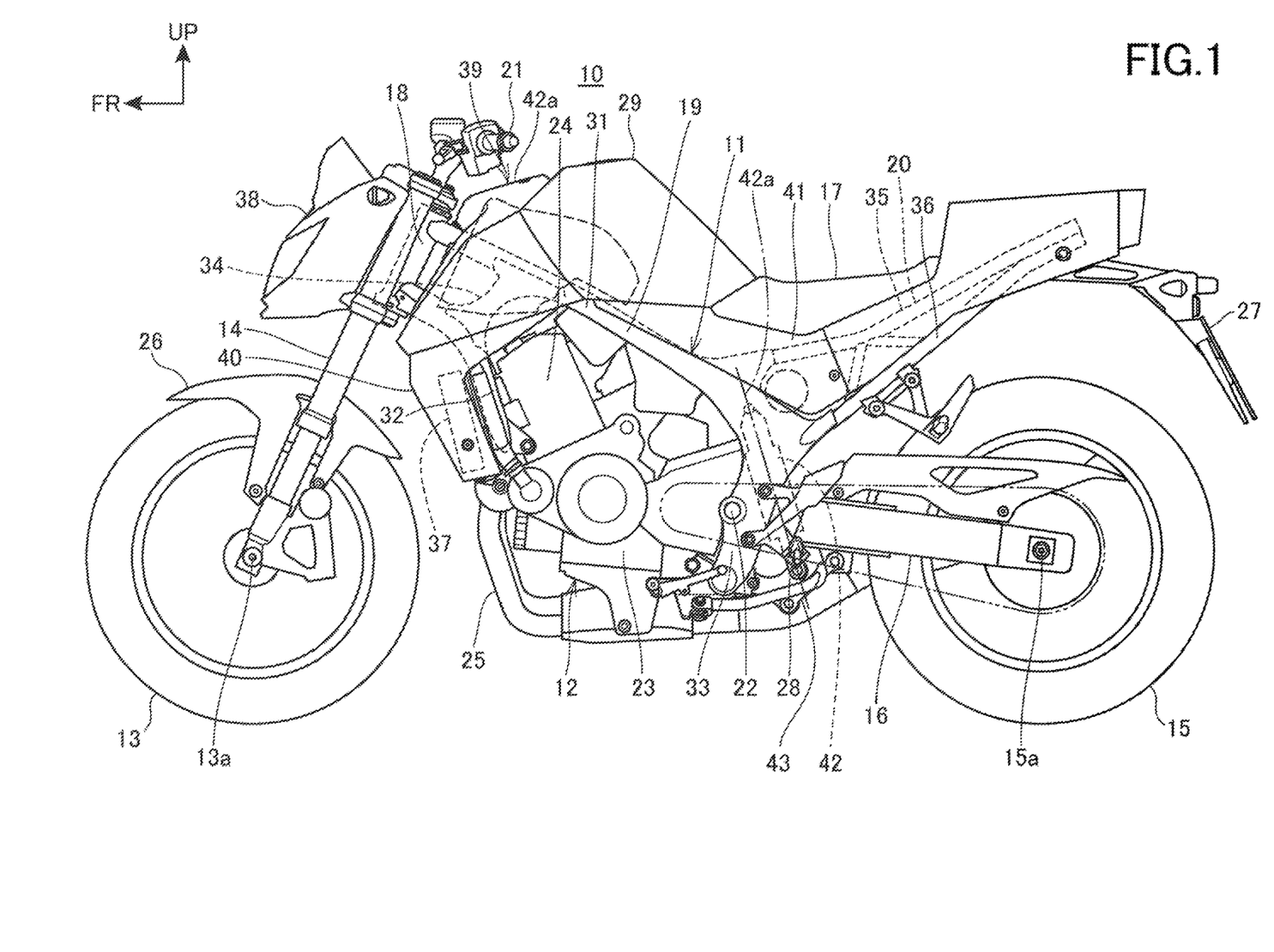
FIG. 1 is a side view of a saddle-ride vehicle according to an embodiment of the present invention.

FIG. 1 is a side view of a saddle-ride vehicle 10 according to an embodiment of the present invention.

The saddle-ride vehicle 10 is a vehicle including a vehicle body frame 11, a power unit 12 supported on the vehicle body frame 11, a front fork 14 that supports a front wheel 13 in a steerable manner, a swing arm 16 that supports a rear wheel 15, and a seat 17 for a rider.

The saddle-ride vehicle 10 is a vehicle on which the rider sits astride the seat 17. The seat 17 is provided above a rear part of the vehicle body frame 11.

The vehicle body frame 11 includes a head pipe 18 provided at a front end portion of the vehicle body frame 11, a front frame 19 located on a rear side of the head pipe 18, and a rear frame 20 located on a rear side of the front frame 19. A front end portion of the front frame 19 is connected to the head pipe 18.

The seat 17 is supported on the rear frame 20.

The front fork 14 is supported on the head pipe 18 in such a manner that it can be steered left and right. The front wheel 13 is supported on an axle 13a provided at a lower end portion of the front fork 14. A handle 21 for steering that the rider grasps is mounted at an upper end portion of the front fork 14.

The swing arm 16 is supported on a pivot shaft 22 that is supported on the vehicle body frame 11. The pivot shaft 22 is a shaft extending horizontally in a vehicle width direction. The pivot shaft 22 is passed through a front end portion of the swing arm 16. The swing arm 16 swings up and down around the pivot shaft 22.

The rear wheel 15 is supported on an axle 15a provided at a rear end portion of the swing arm 16.

The power unit 12 is disposed between the front wheel 13 and the rear wheel 15 and supported on the vehicle body frame 11.

The power unit 12 is an internal combustion engine. The power unit 12 includes a crankcase 23 and a cylinder 24 that houses a reciprocating piston. An exhaust device 25 is connected to an exhaust port of the cylinder 24.

An output of the power unit 12 is transmitted to the rear wheel 15 through a drive power transmission member that connects the power unit 12 and the rear wheel 15 to each other.

The saddle-ride vehicle 10 further includes a front fender 26 that covers the front wheel 13 from above, a rear fender 27 that covers the rear wheel 15 from above, footrests 28 on which the rider places his or her feet, and a fuel tank 29 that stores fuel to be used by the power unit 12.

The front fender 26 is mounted on the front fork 14. The rear fender 27 and the footrests 28 are provided on a lower side relative to the seat 17. The fuel tank 29 is supported on the vehicle body frame 11.

The saddle-ride vehicle 10 is a motorcycle, and the front wheel 13 and the rear wheel 15 are positioned at a center in the vehicle width direction.

The front frame 19 includes a pair of left and right main frames 31 that extend rearward and downward from an upper part of the head pipe 18, a pair of left and right down frames 32 that extend rearward and downward from a lower part of the head pipe 18, a pair of left and right pivot frames 33 that extend downward from a rear end portion of the main frames 31, and a gusset 34 that connects the down frames 32 on a rear side of the head pipe 18.

The rear frame 20 includes a pair of left and right seat frames 35 that extend rearward and upward from the rear end portion of the main frames 31, and a pair of left and right sub frames 36 that extend rearward and upward from an upper end portion of the pivot frames 33 and are connected to a rear end portion of the seat frames 35.

The power unit 12 is disposed between the down frames 32 and the pivot frames 33 below the main frames 31.

The cylinder 24 extends upward from an upper surface at a front part of the crankcase 23.

The fuel tank 29 is disposed between the seat 17 and the head pipe 18 in a vehicle front-rear direction above the main frames 31. The fuel tank 29 is supported on the main frames 31.

A radiator 37 where cooling water of the power unit 12 passes through is disposed on a front side of the cylinder 24 and the down frames 32 and attached to the down frames 32.

The saddle-ride vehicle 10 includes, as a vehicle body cover, a front cover 38 that covers the head pipe 18 from the front side, a tank cover 39 that covers the fuel tank 29 from the front side, a pair of left and right radiator shrouds 40 that cover the radiator 37 from a vehicle width direction outer side, and a pair of left and right side covers 41 that cover a vehicle body below the seat 17 from the vehicle width direction outer side.

The saddle-ride vehicle 10 includes a rear suspension 42 (vehicle suspension) that attenuates an up-down swing of the swing arm 16. An upper end portion of the rear suspension 42 is connected to a rear part of the vehicle body frame 11, and a lower end portion of the rear suspension 42 is connected to the swing arm 16 via a link mechanism 43.

An upper part of the rear suspension 42 is disposed between the left and right pivot frames 33.

Figure 2:
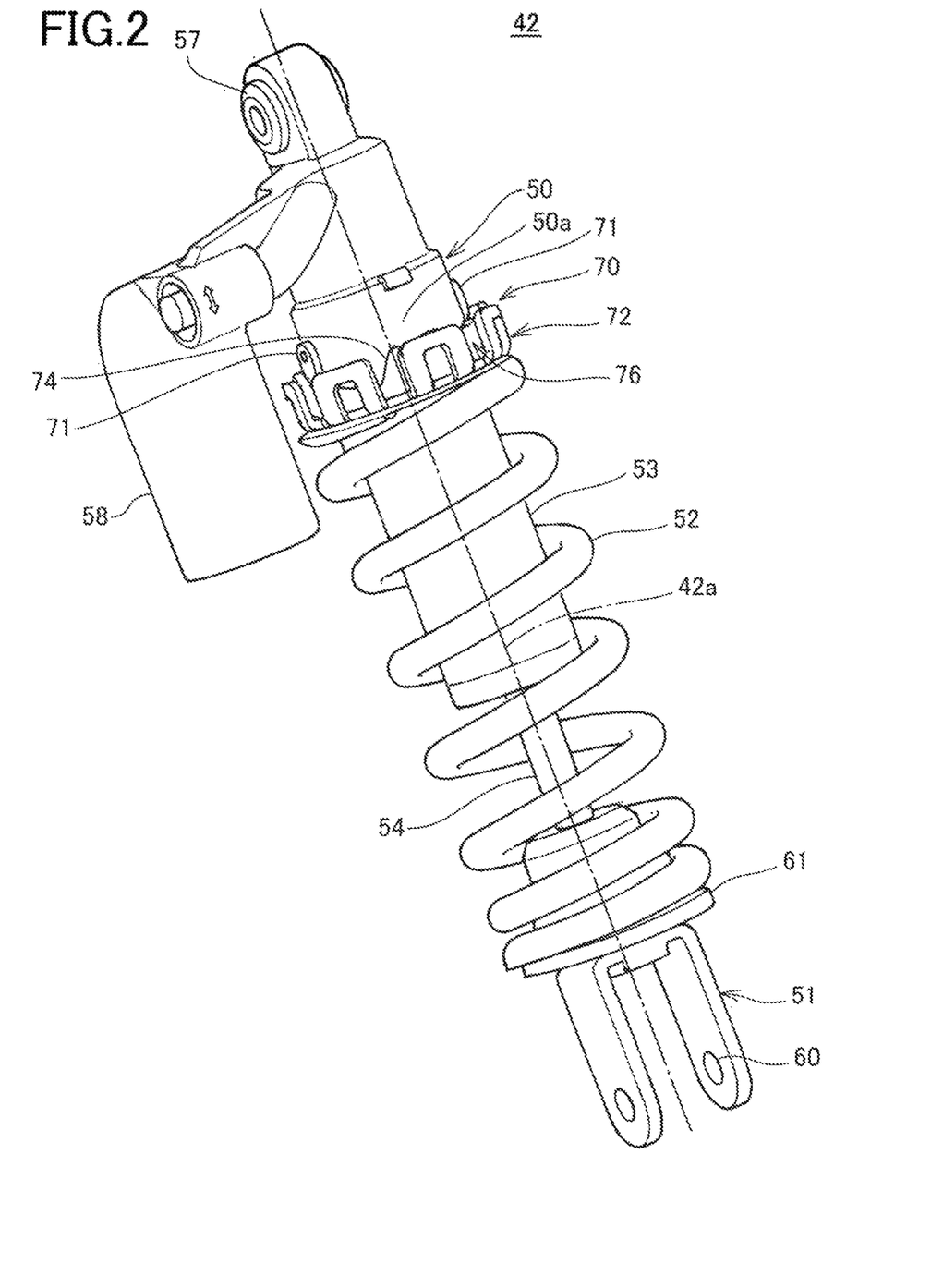
FIG. 2 is a perspective view of a rear suspension.

FIG. 2 is a perspective view of the rear suspension 42.

With reference to FIG. 1 and FIG. 2, the rear suspension 42 is formed in a cylindrical shape extending up and down, is compressed in the axial direction accompanying the up-down swing of the swing arm 16 and absorbs an impact from a road surface by making a stroke in the axial direction.

The rear suspension 42 is disposed in such a posture that a center axis 42a of the stroke of the rear suspension 42 is tilted forward relative to a vertical line. A stroke direction of the rear suspension 42 is the axial direction of the center axis 42a.

The rear suspension 42 includes one end 50 connected to an upper part of the vehicle body frame 11, another end 51 connected to the link mechanism 43, and a spring 52 compressed between the one end 50 and the other end 51.

The one end 50 is an upper end portion of the rear suspension 42 and the other end 51 is a lower end portion of the rear suspension 42.

The rear suspension 42 further includes a cylinder 53 (damper) that extends downward from the one end 50 toward the other end 51, a piston rod 54 that extends upward from the other end 51 toward the one end 50 and is connected to the cylinder 53, and a piston valve (not illustrated) provided on an end of the piston rod 54 and located inside the cylinder 53. An axis of the piston rod 54 is coaxial with the center axis 42a.

Inside the cylinder 53, hydraulic oil for attenuation is filled. When the other end 51 makes a stroke up and down, the piston valve moves integrally with the other end 51 and slides inside the cylinder 53 in the axial direction of the center axis 42a opposing the hydraulic oil.

The spring 52 is a coil spring. The cylinder 53 and the piston rod 54 are inserted to an inner periphery of a coil of the spring 52. That is, the spring 52 is wound around the cylinder 53 and the piston rod 54.

The one end 50 is a cylindrical member that is long up and down.

On an upper end of the one end 50, an upper connection part 57 connected to the vehicle body frame 11 is provided. The one end 50 is connected to the vehicle body frame 11 by an upper connection shaft (not illustrated) inserted to the upper connection part 57 in the vehicle width direction. To an upper part of the one end 50, a reservoir tank 58 that stores the hydraulic oil is connected. The reservoir tank 58 is communicated with an inside of the cylinder 53.

On an outer periphery 50a of a lower part of the one end 50, a preload adjusting mechanism 70 capable of adjusting a preload of the spring 52 by moving in the axial direction of the rear suspension 42 is provided.

On a lower end of the other end 51, a lower connection part 60 connected to the link mechanism 43 is provided. The lower connection part 60 is connected to the link mechanism 43 by a lower connection shaft (not illustrated) inserted to the lower connection part 60 in the vehicle width direction.

On an upper part of the other end 51, a ring-like spring receiving member 61 that receives a lower end of the spring 52 is provided.

The spring 52 is provided in a compressed state between the preload adjusting mechanism 70 at the one end 50 and the spring receiving member 61 at the other end 51, and energizes the other end 51 in a stretching direction of the rear suspension 42.

The preload (initial load) of the spring 52 is reaction of the spring 52 compressed between the preload adjusting mechanism 70 and the spring receiving member 61. Magnitude of the preload corresponds to deflection (compression amount) from a free length of the spring 52.

Figure 3:
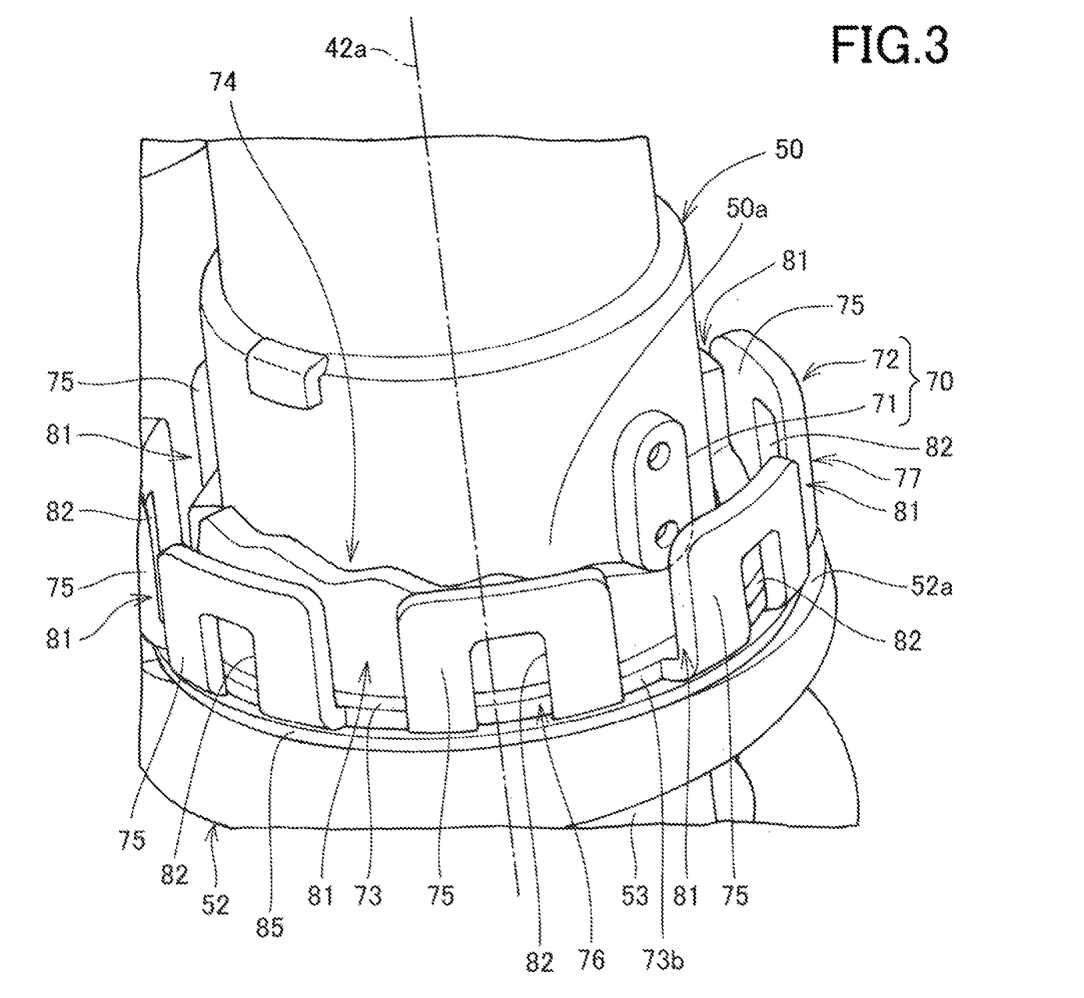
FIG. 3 is a perspective view of a peripheral part of a preload adjusting mechanism.

FIG. 3 is a perspective view of a peripheral part of the preload adjusting mechanism 70.

With reference to FIG. 2 and FIG. 3, the preload adjusting mechanism 70 includes a cam receiving part 71 provided on the outer periphery 50a of the one end 50 and an adjuster part 72 rotatably fitted to the outer periphery 50a of the one end 50.

The cam receiving part 71 is a projection projecting from the outer periphery 50a to a radial direction outer side and is fixed to the outer periphery 50a.

A pair of the cam receiving parts 71 are provided so as to be separated from each other by 180° in a circumferential direction on the outer periphery 50a. The pair of cam receiving parts 71 are provided on same positions in the axial direction of the rear suspension 42.

The adjuster part 72 is held between the cam receiving part 71 and one end 52a of the spring 52 in the axial direction of the rear suspension 42. The one end 52a is an upper end of the spring 52.

The adjuster part 72 includes a ring-like spring receiving part 73 that receives the one end 52a of the spring 52, a cam part 74 that extends from the spring receiving part 73 toward the cam receiving part 71 and a vertical wall part 75 erected in the axial direction of the spring 52 from the spring receiving part 73.

The adjuster part 72 further includes an engaging part 76 with which a tool 78 (see FIG. 10) that rotates the adjuster part 72 is to be engaged.

Figure 4:
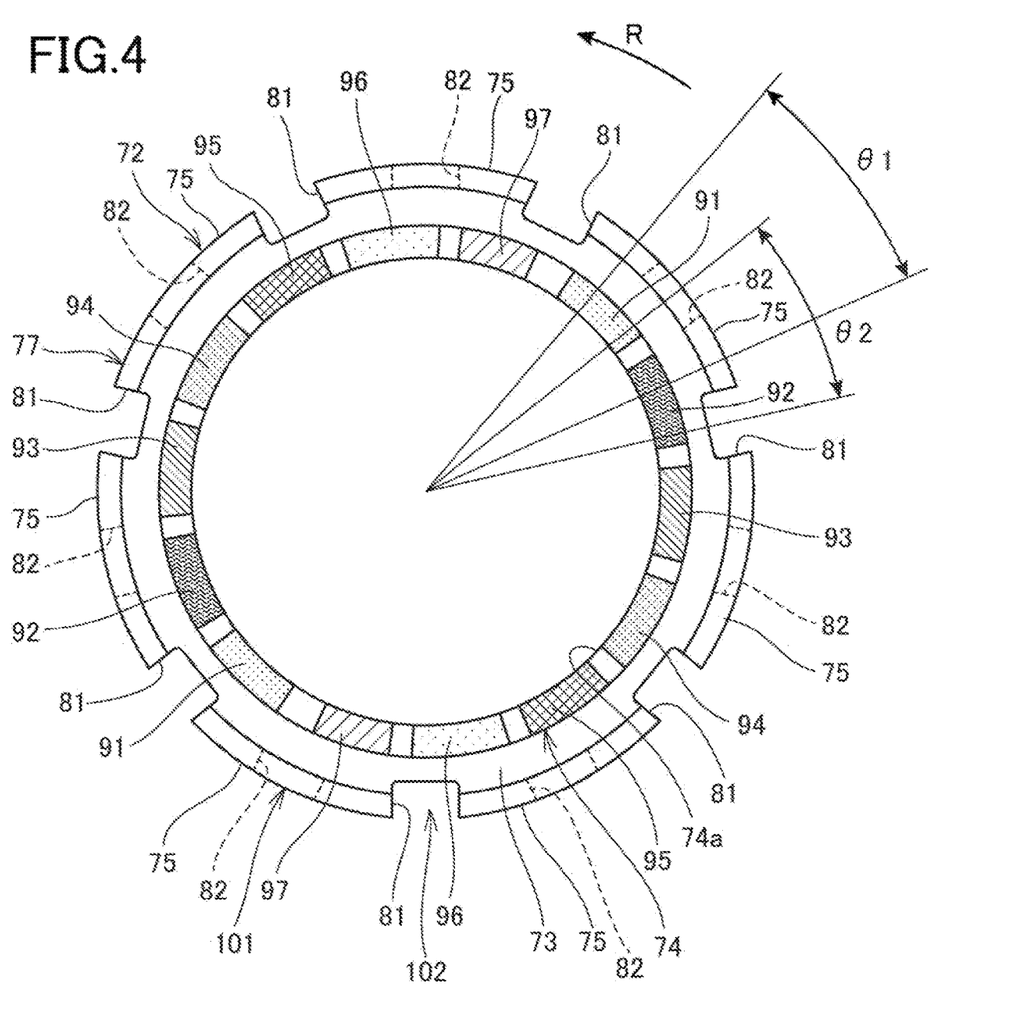
FIG. 4 is a view viewing an adjuster part from above in an axial direction of the rear suspension.
Figure 5:
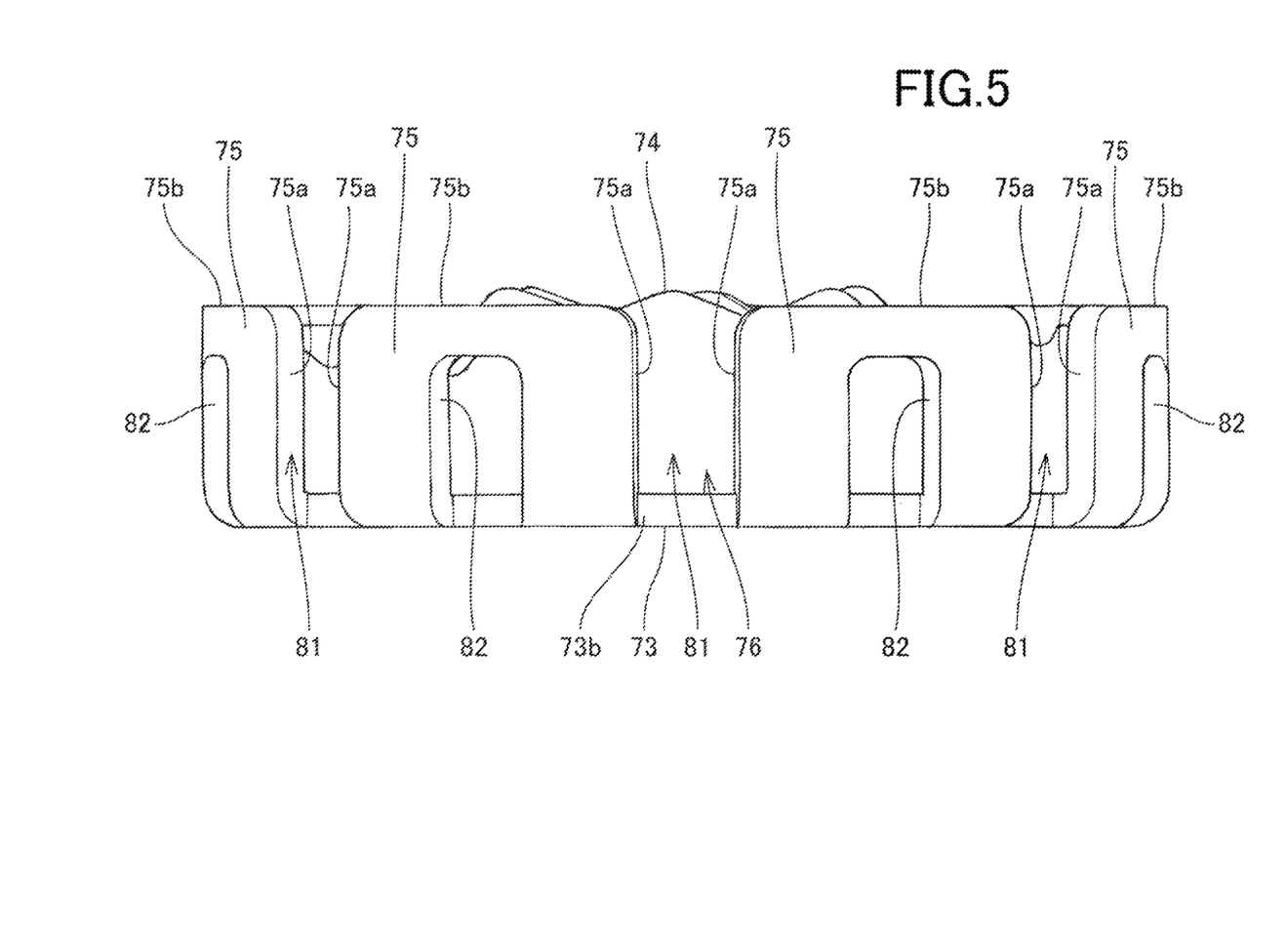
FIG. 5 is a view viewing the adjuster part from an outer peripheral side.
Figure 6:
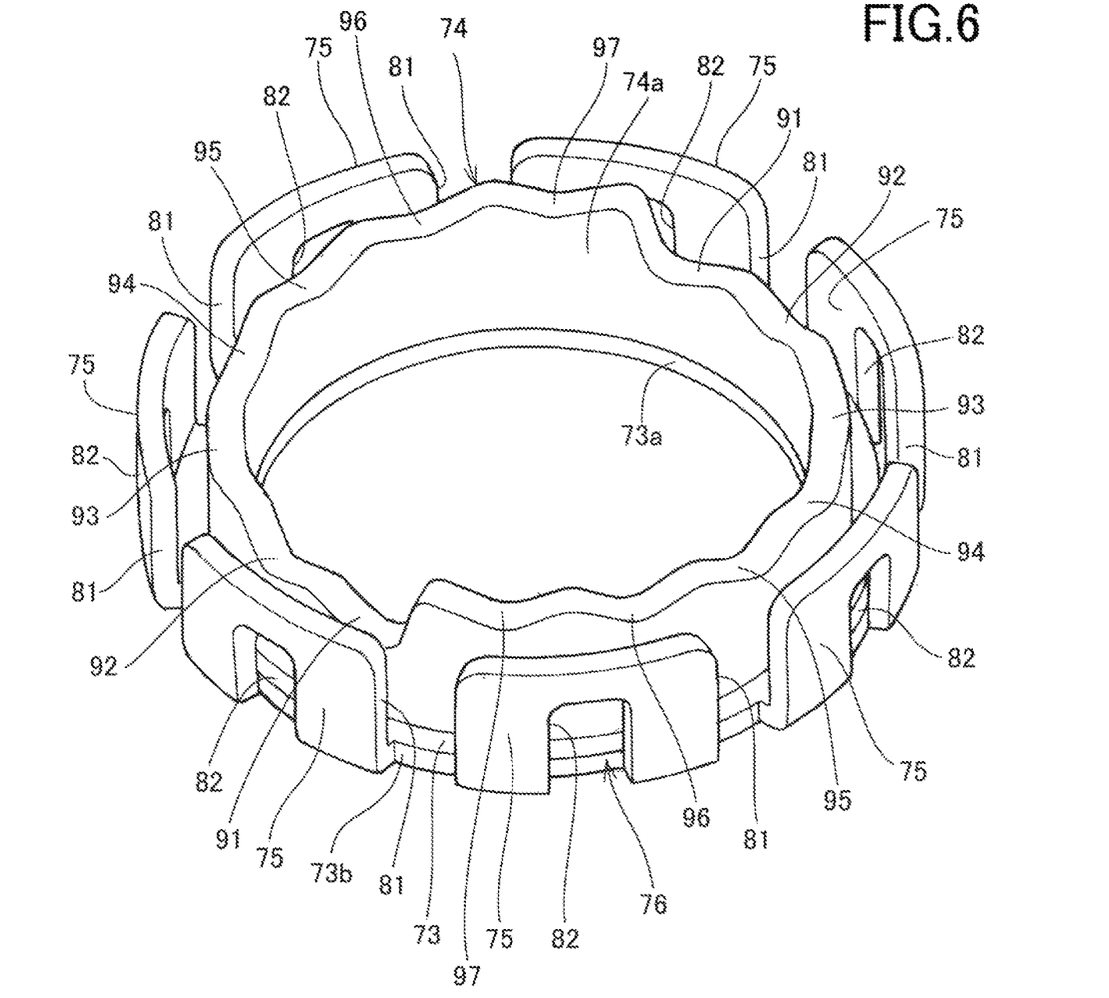
FIG. 6 is a perspective view of the adjuster part.
Figure 7:
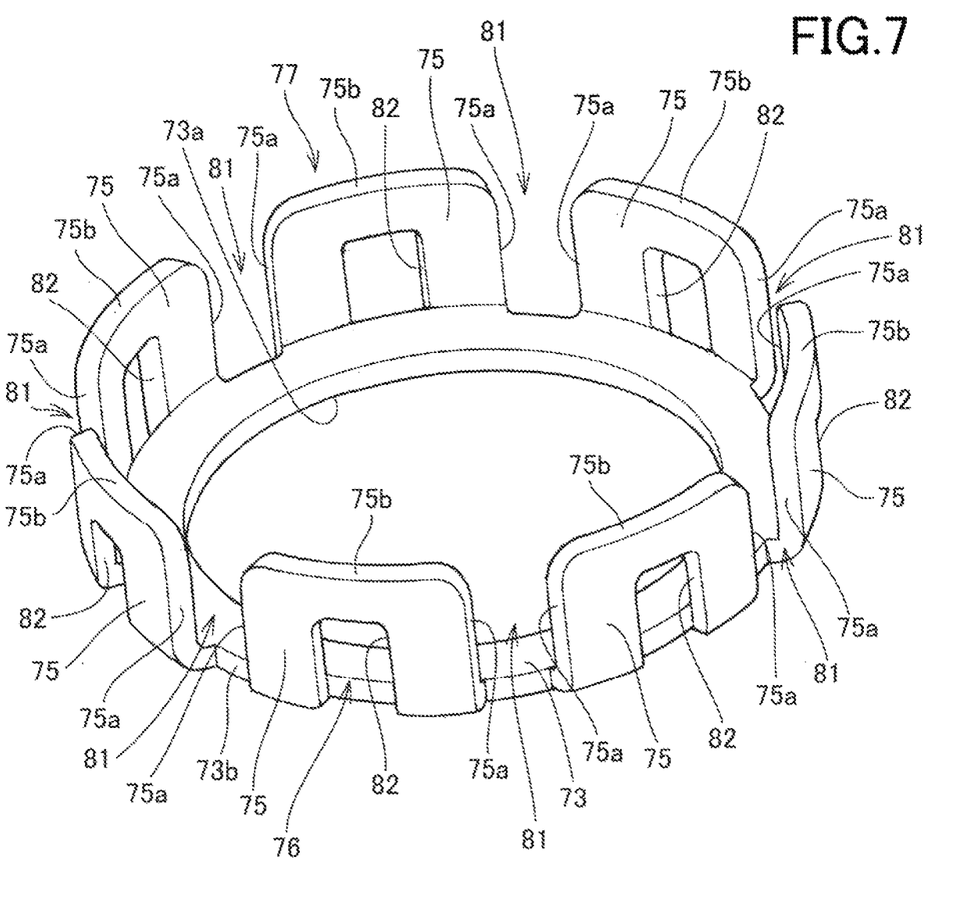
FIG. 7 is a perspective view illustrating a spring receiving part, a vertical wall part and an engaging part.
Figure 8:
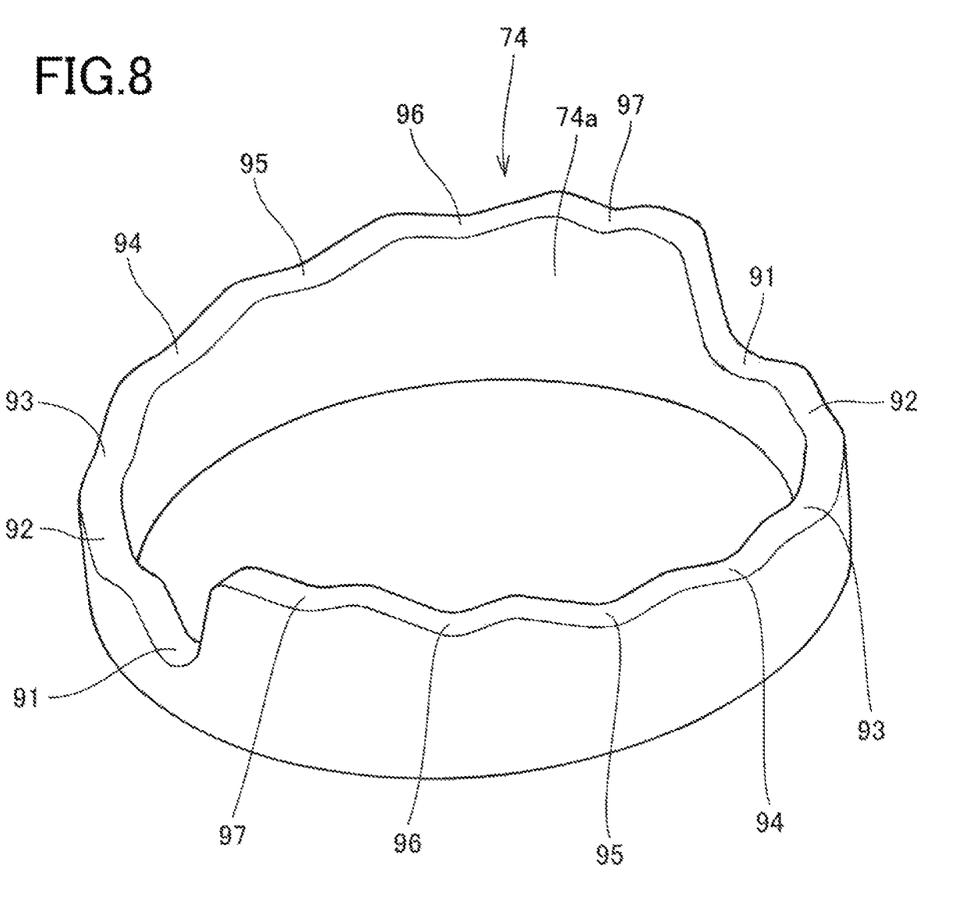
FIG. 8 is a perspective view illustrating a cam part.

FIG. 4 is a view viewing the adjuster part 72 from above in the axial direction of the rear suspension 42. FIG. 5 is a view viewing the adjuster part 72 from an outer peripheral side. FIG. 6 is a perspective view of the adjuster part 72. FIG. 7 is a perspective view illustrating the spring receiving part 73, the vertical wall parts 75 and the engaging parts 76. FIG. 8 is a perspective view illustrating the cam part 74.

With reference to FIG. 3 to FIG. 8, the adjuster part 72 is formed by joining a ring-like member 77 integrally provided with the spring receiving part 73, the vertical wall parts 75 and the engaging parts 76 and the cam part 74 by welding.

The spring receiving part 73 of the ring-like member 77 is a disk-like ring provided coaxially with the center axis 42a. The spring receiving part 73 is formed in a ring shape so as to be along the one end 52a of the spring 52.

On a center of the spring receiving part 73, a hole 73a of a diameter larger than the outer periphery 50a of the one end 50 is provided.

The vertical wall part 75 of the ring-like member 77 extends in the axial direction of the rear suspension 42 from an outer peripheral part 73b of the spring receiving part 73 toward the side of the cam receiving part 71. The vertical wall part 75 is a planar part that extends roughly at right angles to an upper surface of the spring receiving part 73.

The plurality of vertical wall parts 75 are provided at equal intervals in the circumferential direction of the adjuster part 72 at the outer peripheral part 73b. That is, the plurality of the vertical wall parts 75 are disposed separately from each other in the circumferential direction of the adjuster part 72. In the present embodiment, seven vertical wall parts 75 are provided. The individual vertical wall parts 75 are in the same shape. The vertical wall part 75 is in a rectangular shape that is longer in the circumferential direction than in the axial direction of the rear suspension 42 in a view from the outer periphery of the adjuster part 72.

As illustrated in FIG. 7, the vertical wall part 75 includes a pair of side edges 75a that extend upward from the spring receiving part 73 toward the cam receiving part 71 and an upper edge 75b that connects upper ends of the pair of side edges 75a in the circumferential direction.

The engaging part 76 includes a first engaging part 81 formed by a gap between the pair of vertical wall parts 75 adjacent to each other and a second engaging part 82 formed by a hole penetrating the vertical wall part 75.

For details, the first engaging part 81 is a groove-like opening sectioned by the pair of side edges 75a facing each other of the pair of vertical wall parts 75.

When viewing the adjuster part 72 from the radial direction outer side of the adjuster part 72 like FIG. 5, the first engaging part 81 is provided to a position to overlap with a plate thickness portion of the spring receiving part 73 from the radial direction outer side.

The first engaging part 81 is in a groove shape that extends long in the axial direction of the rear suspension 42 and is open upward and downward.

The plurality of first engaging parts 81 are provided at equal intervals in the circumferential direction of the adjuster part 72. In the present embodiment, the first engaging part 81 is provided at all the vertical wall parts 75 and provided at seven locations.

The second engaging part 82 is a rectangular hole penetrating the vertical wall part 75. The second engaging part 82 is provided from an intermediate part of the vertical wall part 75 in the axial direction of the rear suspension 42 to a lower end of the vertical wall part 75. The second engaging part 82 is in a long hole shape that extends long in the axial direction of the rear suspension 42.

When viewing the adjuster part 72 from the radial direction outer side of the adjuster part 72 like FIG. 5, the second engaging part 82 is provided to a position to overlap with the plate thickness portion of the spring receiving part 73 from the radial direction outer side.

The second engaging part 82 is provided in each vertical wall part 75. The second engaging part 82 is provided on the intermediate part in the circumferential direction of each vertical wall part 75. The plurality of second engaging parts 82 are provided at equal intervals in the circumferential direction of the adjuster part 72. In the present embodiment, the second engaging part 82 is provided in all the vertical wall parts 75 and provided at seven locations.

The first engaging parts 81 and the second engaging parts 82 are disposed alternately at equal intervals in the circumferential direction of the adjuster part 72.

With reference to FIG. 7, the ring-like member 77 integrally including the spring receiving part 73, the vertical wall parts 75 and the engaging parts 76 is formed by pressing a plate material.

The vertical wall parts 75 are formed by bending the plate material relative to the spring receiving part 73. In a stage before the bending, parts corresponding to the spring receiving part 73, the hole 73a, the second engaging parts 82 and the first engaging parts 81 are formed by punching of pressing. In the state, the vertical wall parts 75 are planar parts that are flat with the spring receiving part 73 and extend radially from the spring receiving part 73 to the radial direction outer side. Thereafter, by bending the parts of the vertical wall parts 75 by bending of the pressing, the ring-like member 77 is formed.

In the present embodiment, when bending the vertical wall part 75, since a notched part corresponding to the first engaging part 81 is provided, it is easy to bend the vertical wall part 75.

With reference to FIG. 3 to FIG. 8, the cam part 74 is in a cylindrical shape that extends in the axial direction of the rear suspension 42. The cam part 74 is fitted to the outer periphery 50a of the one end 50.

On an end face on the side of the cam receiving part 71 in the cam part 74, a plurality of cam surfaces to be in contact with the cam receiving part 71 in the axial direction are provided. As the cam surfaces, a first cam surface 91, a second cam surface 92, a third cam surface 93, a fourth cam surface 94, a fifth cam surface 95, a sixth cam surface 96 and a seventh cam surface 97 are provided. In FIG. 4, the first cam surface 91 to the seventh cam surface 97 are hatched differently from each other so as to be distinguished.

The cam surfaces are disposed at equal intervals in order of the first cam surface 91, the second cam surface 92, the third cam surface 93, the fourth cam surface 94, the fifth cam surface 95, the sixth cam surface 96 and the seventh cam surface 97 in the circumferential direction of the cam part 74.

A height of the cam surface in the axial direction of the cam part 74 is formed stepwise so as to gradually increase as moving in the circumferential direction of the cam part 74.

For details, the first cam surface 91 is the lowest and the height of the cam surface gradually increases as going toward the side of the seventh cam surface 97.

The first cam surface 91 to the seventh cam surface 97 extend in the axial direction of the rear suspension 42 from the spring receiving part 73 toward the cam receiving part 71.

For the cam surfaces, when the first cam surface 91, the second cam surface 92, the third cam surface 93, the fourth cam surface 94, the fifth cam surface 95, the sixth cam surface 96 and the seventh cam surface 97 are defined as one set, two sets of the cam surfaces are provided on the end face of the cam part 74.

For details, for the cam surfaces, a pair of the cam surfaces of the same height are disposed so as to face each other in a radial direction of the adjuster part 72. For example, the height of the pair of the first cam surfaces 91 is the same and the pair of the first cam surfaces 91 are disposed at positions different from each other by 180° in the circumferential direction of the adjuster part 72 and face each other in the radial direction of the adjuster part 72. It is also similar for the second cam surface 92 to the seventh cam surface 97.

The cam part 74 is disposed coaxially with the center axis 42a. The cam part 74 extends in the axial direction of the rear suspension 42 from a peripheral edge part of the hole 73a of the spring receiving part 73. The cam part 74 is joined to the peripheral edge part of the hole 73a by welding.

The cam part 74 and the plurality of vertical wall parts 75 disposed in an annular arrangement are in a concentric shape with the center axis 42a as the center. The cam part 74 is disposed on a radial direction inner side separately from the vertical wall parts 75 in the annular arrangement. The vertical wall parts 75 are disposed on the radial direction outer side of the cam part 74 and cover the cam part 74 from the outer peripheral side.

The adjuster part 72 is disposed on the one end 50 by an inner peripheral surface 74a of the cam part 74 being fitted to the outer periphery 50a of the one end 50. The adjuster part 72 is rotatable around the center axis 42a on the one end 50 and is movable in the axial direction of the rear suspension 42.

Between the spring receiving part 73 of the adjuster part 72 and the one end 52a of the spring 52, a ring-like washer 85 (FIG. 3) is interposed.

The adjuster part 72 is pressed to the pair of the cam receiving parts 71 by the reaction of the spring 52. For details, the adjuster part 72 is engaged with a lower end part of the cam receiving part 71 via the cam part 74.

At the cam part 74, the pair of the cam surfaces of the same height are engaged with the pair of the cam receiving parts 71. Cam surfaces which are any of the first cam surface 91 to the seventh cam surface 97 are selectively engaged with the pair of cam receiving parts 71. When the cam surfaces to be engaged with the pair of cam receiving parts 71 is changed, the position of the adjuster part 72 in the axial direction of the rear suspension 42 is changed and the preload is changed.

When the adjuster part 72 is rotated, the cam surfaces to be engaged with the pair of cam receiving parts 71 is changed and the preload is changed.

For example, when the pair of the first cam surfaces 91 of the lowest height are engaged with the pair of the cam receiving parts 71, the preload becomes minimum.

Further, when the pair of the seventh cam surfaces 97 of the highest height are engaged with the pair of the cam receiving parts 71, the preload becomes maximum.

In the rear suspension 42, since seven types of the first cam surface 91 to the seventh cam surface 97 of different heights are provided, the preload can be changed in seven stages. That is, a total number of the stages of preload adjustment is seven.

With reference to FIG. 4, an interval $\theta1$ in the circumferential direction of the individual cam surfaces is a value for which 360° is divided by the total number of the cam surfaces. In the cam part 74, since the total number of the cam surfaces is 14, the interval $\theta1$ is roughly 25.7°. That is, the two sets of the first cam surface 91 to the seventh cam surface 97 are provided at every interval of roughly 25.7°.

The interval $\theta1$ is a rotation angle of the adjuster part 72 when the preload is adjusted by one stage.

With reference to FIG. 4, an angle $\theta2$ by which the first engaging part 81 and the second engaging part 82 adjacent to each other are separated from each other in the circumferential direction of the adjuster part 72 is a value for which 360° is divided by the total number of the engaging parts 76.

In the cam part 74, the total number of the engaging parts 76 is 14, which is a sum of the total number (seven) of the first engaging parts 81 and the total number (seven) of the second engaging parts 82. Accordingly, the angle $\theta2$ is roughly 25.7°. That is, the first engaging parts 81 and the second engaging parts 82 are alternately provided at every interval of roughly 25.7°.

The total number of the first engaging parts 81 and the second engaging parts 82 is double of seven stages which is the total number of the stages of the preload adjustment, and is 14. Accordingly, the interval $\theta1$ and the angle $\theta2$ are the same.

Figure 9:
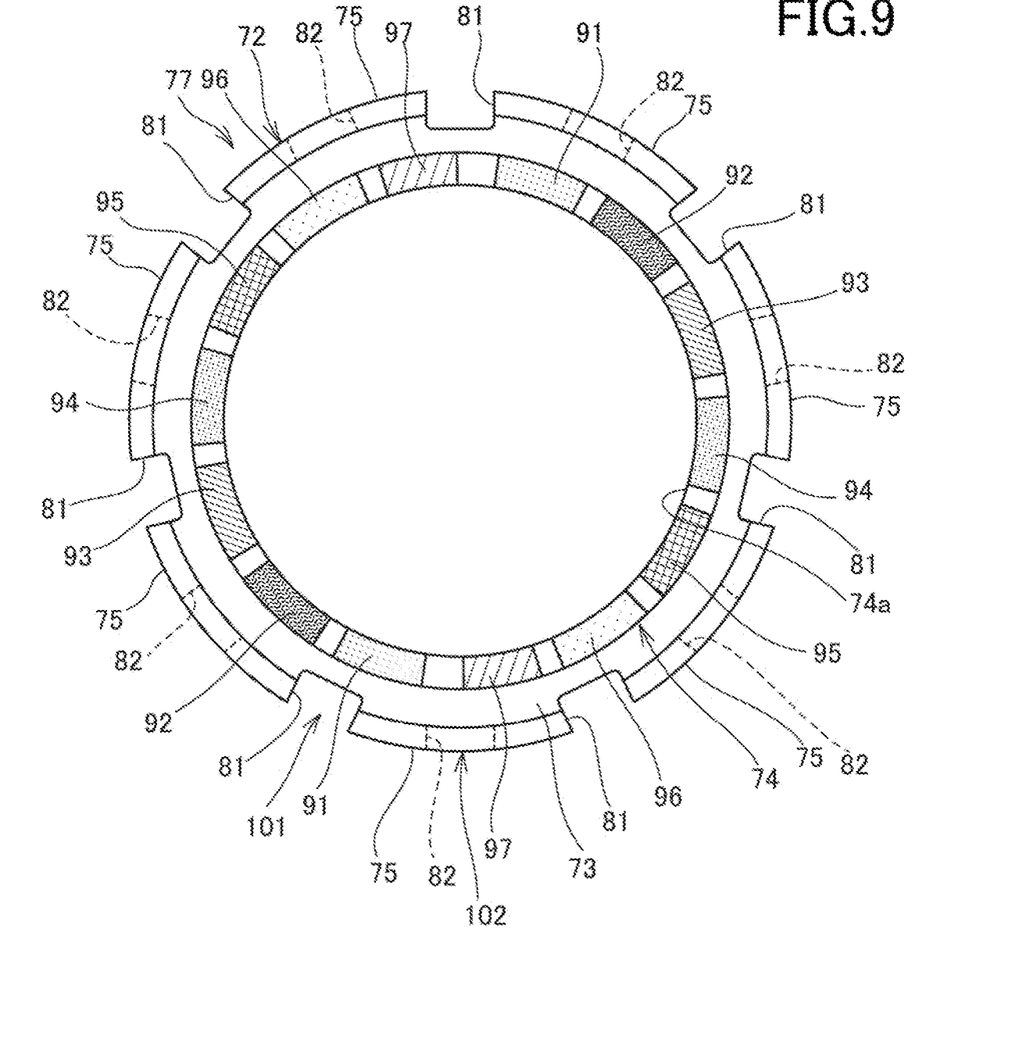
FIG. 9 is a view illustrating a state of rotating the adjuster part and changing a preload by one stage relative to FIG. 4.

FIG. 9 is a view illustrating a state of rotating the adjuster part 72 and changing the preload by one stage relative to FIG. 4.

In FIG. 9, the adjuster part 72 is rotated in a counterclockwise direction R in FIG. 4 and the preload is changed to increase only one stage.

With reference to FIG. 4 and FIG. 9, since the interval θ1 and the angle θ2 are the same, when the adjuster part 72 is rotated by only one stage, the second engaging part 82 is moved to the position where the first engaging part 81 is located before the rotation. It is similar when the preload is further changed by one stage. That is, even when the engaging parts 76 of the adjuster part 72 are rotated by the preload adjustment, general positions are not shifted.

Figure 10:
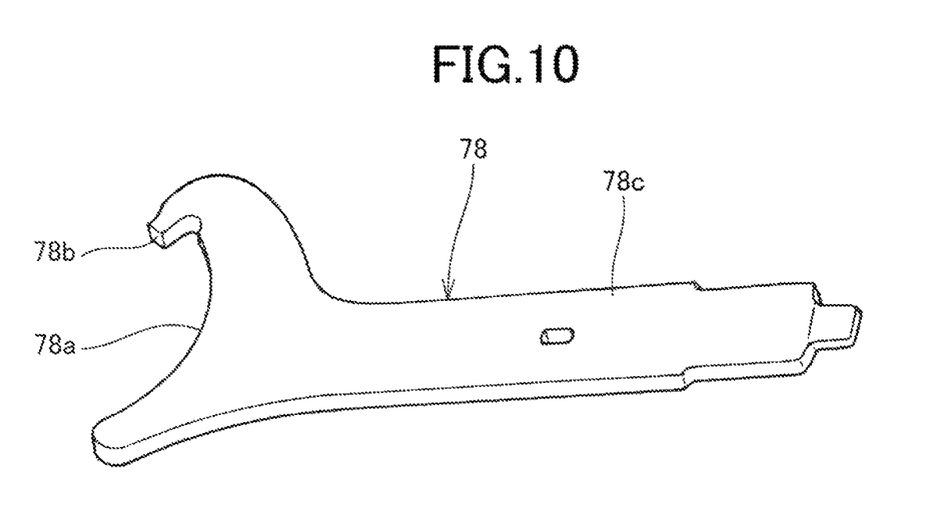
FIG. 10 is a perspective view illustrating a tool to rotate the adjuster part.

FIG. 10 is a perspective view illustrating the tool 78 to rotate the adjuster part 72.

The tool 78 includes an arc-shaped guide part 78a to be along an outer peripheral surface of the vertical wall part 75 of the adjuster part 72, a claw part 78b projected from the guide part 78a to be engaged with the engaging part 76 and a holding part 78c that extends from the guide part 78a.

An operator butts the guide part 78a to the outer peripheral surface of the vertical wall part 75 and engages the claw part 78b with one of the first engaging part 81 and the second engaging part 82. Then, the operator holds the holding part 78c and rotates the tool 78 to rotate the adjuster part 72. Thus, the preload is adjusted.

In the rear suspension 42, since the engaging parts 76 include both of the first engaging parts 81 and the second engaging parts 82, the number of the engaging parts 76 is large. Accordingly, the tool 78 can be easily engaged with the engaging part 76 and the preload is easily adjusted.

FIG. 4 and FIG. 9 illustrate a first engaging position 101 and a second engaging position 102 where the tool 78 is easily engaged in the engaging part 76.

The first engaging position 101 and the second engaging position 102 are separated from each other by the angle θ2 (roughly 25.7°). The first engaging position 101 and the second engaging position 102 are the positions where the tool 78 can be easily engaged with the engaging part 76 in terms of a positional relation with the vehicle body frame 11 and components or the like around the adjuster part 72.

The first engaging position 101 and the second engaging position 102 are, for example, in the state of loading the rear suspension 42 on the saddle-ride vehicle 10, positioned at a rear surface part of the rear suspension 42. In this case, the first engaging position 101 and the second engaging position 102 can be easily accessed from a part open rearward between the left and right pivot frames 33.

No matter which stage the preload is to be adjusted to, the operator can rotate the adjuster part 72 by engaging the tool 78 with the engaging part 76 positioned at the first engaging position 101 and the second engaging position 102.

For example, in the case of changing the preload from the state in FIG. 4 to the state in FIG. 9, the operator engages the tool with the second engaging part 82 at the first engaging position 101 in FIG. 4 and rotates the adjuster part 72 by the angle θ2 in the counterclockwise direction R to the position of the second engaging position 102.

In the case of further increasing the preload by one stage, the operator engages the tool with the first engaging part 81 at the first engaging position 101 in FIG. 9 and rotates the adjuster part 72 by the angle θ2 in the counterclockwise direction R to the position of the second engaging position 102.

That is, the operator can adjust the preload by repeating the rotation of the adjuster part 72 by the angle θ2 (roughly 25.7°) between the first engaging position 101 and the second engaging position 102.

Accordingly, the rotation angle (stroke) of the tool 78 when the preload is adjusted can be reduced and an operation is possible with the same stroke so that the preload is easily adjusted. Further, since the rotation angle of the tool 78 is reduced, the components or the like can be easily disposed around the adjuster part 72 and a degree of freedom of component arrangement is improved.

Note that the first engaging position 101 and the second engaging position 102 are examples and the tool 78 may be engaged with the engaging part 76 at another location.

As described above, according to the embodiment to which the present invention is applied, the rear suspension 42 includes the one end 50, the other end 51 configured to make a stroke relative to the one end 50, the spring 52 compressed between the one end 50 and the other end 51 and the preload adjusting mechanism 70 capable of adjusting the preload of the spring 52, the preload adjusting mechanism 70 includes the cam receiving part 71 provided on the outer periphery 50a of the one end 50 and the adjuster part 72 rotatably fitted to the outer periphery 50a of the one end 50, the adjuster part 72 includes the ring-like spring receiving part 73 configured to receive the one end 52a of the spring 52 and the cam part 74 provided with the plurality of the first cam surface 91 to the seventh cam surface 97 extending from the spring receiving part 73 toward the cam receiving part 71, and the preload is adjusted by selective engagement of the first cam surface 91 to the seventh cam surface 97 of the different heights with the cam receiving part 71 by the rotation of the adjuster part 72. The adjuster part 72 includes the vertical wall part 75 erected in the axial direction of the spring 52 from the spring receiving part 73 and the engaging part 76 with which the tool 78 to rotate the adjuster part 72 is to be engaged, and the engaging part 76 includes the first engaging part 81 formed by the gap between the plurality of vertical wall parts 75 disposed separately from each other in the circumferential direction of the adjuster part 72 and the second engaging part 82 formed by the hole penetrating the vertical wall part 75.

With this configuration, since the engaging part 76 with which the tool 78 to rotate the adjuster part 72 is to be engaged includes the first engaging part 81 formed by the gap between the plurality of vertical wall parts 75 and the second engaging part 82 formed by the hole penetrating the vertical wall part 75, the number of the engaging parts 76 can be increased by a simple structure. Therefore, the tool 78 can be easily engaged with the engaging part 76 and preload adjusting work is facilitated.

In addition, the cam part 74 is in the cylindrical shape fitted to the outer periphery 50a of the one end 50, the first cam surface 91 to the seventh cam surface 97 are plurally disposed at the equal intervals in the circumferential direction, the individual engaging parts 76 are disposed at the equal intervals in the circumferential direction of the adjuster part 72, the preload is gradually adjusted by the engagement of the first cam surface 91 to the seventh cam surface 97 with the cam receiving part 71, and the interval θ1 that is the rotation angle of the adjuster part 72 when the preload is adjusted by one stage and the angle θ2 by which the engaging parts 76 adjacent to each other are separated from each other in the circumferential direction are the same.

With this configuration, since the interval θ1 and the angle θ2 are the same, no matter which stage the preload is adjusted to, the engaging part 76 is at a fixed position. Therefore, the rotation angle of the tool 78 when rotating the adjuster part 72 with the tool 78 can be reduced and the operation is possible with the same stroke.

Further, the preload is adjusted in each stage by the engagement of the pair of the cam surfaces of the same height facing each other in the radial direction of the adjuster part 72 with the cam receiving part 71, and the total number of the first engaging parts 81 and the second engaging parts 82 is the double of the total number of the stages of the preload adjustment.

With this configuration, since the pair of the cam surfaces of the same height face each other in the radial direction of the adjuster part 72, a load of the spring 52 can be stably received by the adjuster part 72. Since the total number of the first engaging parts 81 and the second engaging parts 82 is the double of the total number of the stages of the preload adjustment, no matter which stage the preload is adjusted to, the engaging part 76 is at the fixed position. Therefore, the rotation angle of the tool 78 when rotating the adjuster part 72 with the tool 78 can be reduced.

Further, the vertical wall part 75 is disposed on the radial direction outer side relative to the cam part 74 and covers the cam part 74 from the outer peripheral side.

With this configuration, the vertical wall part 75 can be provided compactly on the outer peripheral side of the cam part 74 and the cam part 74 can be protected by the vertical wall part 75.

In addition, the spring receiving part 73 and the vertical wall part 75 are integrally formed, and the cam part 74 is formed separately from the spring receiving part 73 and is joined to the spring receiving part 73.

With this configuration, since the cam part 74 is formed separately from the spring receiving part 73, it is easy to manufacture the cam part 74. Further, it is easy to manufacture the spring receiving part 73 and the vertical wall part 75.

Further, the spring receiving part 73, the vertical wall part 75, the first engaging part 81, and the second engaging part 82 are integrally formed by pressing the plate material.

With this configuration, the spring receiving part 73, the vertical wall part 75, the first engaging part 81, and the second engaging part 82 can be easily formed.

In addition, the second engaging part 82 is provided to the position to overlap with the spring receiving part 73 from the radial direction outer side when the adjuster part 72 is viewed from the radial direction outer side of the adjuster part 72.

With this configuration, since a range of the second engaging part 82 becomes long, the tool 78 is easily engaged with the second engaging part 82.

Further, the first engaging part 81 is provided to the position to overlap with the spring receiving part 73 from the radial direction outer side when the adjuster part 72 is viewed from the radial direction outer side of the adjuster part 72.

With this configuration, since a range of the first engaging part 81 becomes long, the tool 78 is easily engaged with the first engaging part 81.

Note that the embodiment described above illustrates one aspect to which the present invention is applied and the present invention is not limited to the embodiment described above.

A motorcycle is described as an example of the saddle-ride vehicle 10 in the embodiment described above, however, the present invention is not limited thereto and the present invention is applicable to a three-wheel vehicle including two front wheels or rear wheels and a vehicle including four or more wheels.

Configurations Supported by Embodiment Described Above

The embodiment described above supports the configurations below.

(Configuration 1) A vehicle suspension including one end, another end, a spring, and a preload adjusting mechanism, the other end being configured to make a stroke relative to the one end, the spring being compressed between the one end and the other end, the preload adjusting mechanism being capable of adjusting a preload of the spring, the preload adjusting mechanism including a cam receiving part and an adjuster part, the cam receiving part being provided on an outer periphery of the one end, the adjuster part being rotatably fitted to the outer periphery of the one end, the adjuster part including a spring receiving part and a cam part, the spring receiving part having a ring-like shape and being configured to receive one end of the spring, the cam part being provided with a plurality of cam surfaces extending from the spring receiving part toward the cam receiving part, the preload being adjusted by selective engagement of the cam surfaces with the cam receiving part by rotation of the adjuster part, the cam surfaces having different heights, wherein the adjuster part includes a vertical wall part and an engaging part, the vertical wall part being erected in an axial direction of the spring from the spring receiving part, a tool to rotate the adjuster part being to be engaged with the engaging part, and the engaging part includes a first engaging part and a second engaging part, the first engaging part being formed by a gap between the plurality of vertical wall parts disposed separately from each other in a circumferential direction of the adjuster part, the second engaging part being formed by a hole penetrating the vertical wall part.

With this configuration, since the engaging part with which the tool to rotate the adjuster part is to be engaged includes the first engaging part formed by the gap between the plurality of vertical wall parts and the second engaging part formed by the hole penetrating the vertical wall part, the number of the engaging parts can be increased by a simple structure. Therefore, the tool can be easily engaged with the engaging part and preload adjusting work is facilitated.

(Configuration 2) The vehicle suspension according to Configuration 1, wherein the cam part is in a cylindrical shape fitted to the outer periphery of the one end, the plurality of cam surfaces are disposed at equal intervals in the circumferential direction, the individual engaging parts are disposed at equal intervals in the circumferential direction of the adjuster part, the preload is gradually adjusted by the engagement of the cam surfaces with the cam receiving part, and a rotation angle of the adjuster part when the preload is adjusted by one stage and an angle by which the engaging parts adjacent to each other are separated from each other in the circumferential direction are the same.

With this configuration, since the rotation angle of the adjuster part when the preload is adjusted by one stage and the angle by which the engaging parts adjacent to each other are separated from each other in the circumferential direction are the same, no matter which stage the preload is adjusted to, the engaging part is at a fixed position. Therefore, the rotation angle of the tool when rotating the adjuster part with the tool can be reduced and the operation is possible with the same stroke.

(Configuration 3) The vehicle suspension according to Configuration 2, wherein adjustment of stages of the preload is performed by the engagement of a pair of the cam surfaces with the cam receiving part, the pair of the cam surfaces having the same height and facing each other in a radial direction of the adjuster part, and a total number of the first engaging parts and the second engaging parts is double of a total number of the stages of preload adjustment.

With this configuration, since the pair of the cam surfaces of the same height face each other in the radial direction of the adjuster part, a load of the spring can be stably received by the adjuster part. Since the total number of the first engaging parts and the second engaging parts is the double of the total number of the stages of the preload adjustment, no matter which stage the preload is adjusted to, the engaging part is at the fixed position. Therefore, the rotation angle of the tool when rotating the adjuster part with the tool can be reduced.

(Configuration 4) The vehicle suspension according to any one of Configurations 1 to 3, wherein the vertical wall part is disposed on a radial direction outer side relative to the cam part and covers the cam part from an outer peripheral side.

With this configuration, the vertical wall part can be provided compactly on the outer peripheral side of the cam part and the cam part can be protected by the vertical wall part.

(Configuration 5) The vehicle suspension according to any one of Configurations 1 to 4, wherein the spring receiving part and the vertical wall part are integrally formed, and the cam part is formed separately from the spring receiving part and is joined to the spring receiving part.

With this configuration, since the cam part is formed separately from the spring receiving part, it is easy to manufacture the cam part. Further, it is easy to manufacture the spring receiving part and the vertical wall part.

(Configuration 6) The vehicle suspension according to any one of Configurations 1 to 5, wherein the spring receiving part, the vertical wall part, the first engaging part, and the second engaging part are integrally formed by pressing a plate material.

With this configuration, the spring receiving part, the vertical wall part, the first engaging part, and the second engaging part can be easily formed.

(Configuration 7) The vehicle suspension according to any one of Configurations 1 to 6, wherein the second engaging part is provided to a position to overlap with the spring receiving part from a radial direction outer side when the adjuster part is viewed from a radial direction outer side of the adjuster part.

With this configuration, since a range of the second engaging part becomes long, the tool is easily engaged with the second engaging part.

(Configuration 8) The vehicle suspension according to Configuration 7, wherein the first engaging part is provided to a position to overlap with the spring receiving part from the radial direction outer side when the adjuster part is viewed from the radial direction outer side of the adjuster part.

With this configuration, since a range of the first engaging part becomes long, the tool is easily engaged with the first engaging part.

REFERENCE SIGNS LIST 10 saddle-ride vehicle (vehicle)
42 rear suspension (vehicle suspension)
50 one end
50a outer periphery
51 other end
52 spring
52a one end
70 preload adjusting mechanism
71 cam receiving part
72 adjuster part
73 spring receiving part
74 cam part
75 vertical wall part
76 engaging part
78 tool
81 first engaging part
82 second engaging part
91 first cam surface (cam surface)
92 second cam surface (cam surface)
93 third cam surface (cam surface)
94 fourth cam surface (cam surface)
95 fifth cam surface (cam surface)
96 sixth cam surface (cam surface)
97 seventh cam surface (cam surface)
θ1 interval (rotation angle of adjuster part when preload is adjusted by one stage)
θ2 angle (angle by which engaging parts adjacent to each other are separated in circumferential direction)

What is claimed is:

1. A vehicle suspension comprising one end, another end, a spring, and a preload adjusting mechanism, the other end being configured to make a stroke relative to the one end, the spring being compressed between the one end and the other end, the preload adjusting mechanism being capable of adjusting a preload of the spring, the preload adjusting mechanism including cam receiving parts and an adjuster part, the cam receiving parts being provided on an outer periphery of the one end, the adjuster part being rotatably fitted to the outer periphery of the one end, the adjuster part including a spring receiving part and a cam part, the spring receiving part having a ring-like shape and being configured to receive one end of the spring, the cam part being provided with a plurality of cam surfaces extending from the spring receiving part toward the cam receiving parts, the preload being adjusted by selective engagement of the cam surfaces with the cam receiving parts by rotation of the adjuster part, the cam surfaces having different heights, wherein
the adjuster part includes a plurality of vertical wall parts and an engaging part with which a tool for rotating the adjuster part is engaged, the plurality of vertical wall parts extending in an axial direction of the spring from the spring receiving part,
the engaging part includes first engaging parts and second engaging parts, each of the first engaging parts being formed by a gap between a pair of the vertical wall parts adjacent to each other among the plurality of vertical wall parts disposed separately from each other in a circumferential direction of the adjuster part, the second engaging parts being formed by holes penetrating the respective plurality of vertical wall parts,
the cam part has a cylindrical shape fitted to the outer periphery of the one end, the plurality of cam surfaces are disposed at equal intervals in a circumferential direction,
the first engaging parts and the second engaging parts are disposed alternately at equal intervals in the circumferential direction of the adjuster part,
the preload is gradually adjusted by engagement of the cam surfaces with the cam receiving parts,
wherein a rotation angle is a rotation angle of the adjuster part when the preload is adjusted by one stage, wherein an angle is an angle by which the engaging parts adjacent to each other are separated from each other in the circumferential direction, and wherein the rotation angle and the angle are equal, adjustment of stages of the preload is performed by the engagement of a pair of the cam surfaces with the cam receiving parts, the pair of the cam surfaces being of equal height to one another and facing each other in a radial direction of the adjuster part, and a total number of the first engaging parts and the second engaging parts is double that of a total number of the stages of preload adjustment.

2. The vehicle suspension according to claim 1, wherein the plurality of vertical wall parts are disposed on a radial direction outer side relative to the cam part and covers the cam part from an outer peripheral side.

3. The vehicle suspension according to claim 1, wherein the spring receiving part and the plurality of vertical wall parts are integrally formed, and the cam part is formed separately from the spring receiving part and is joined to the spring receiving part.

4. The vehicle suspension according to claim 1, wherein the spring receiving part, the plurality of vertical wall parts, the first engaging parts, and the second engaging parts are integrally formed by pressing a plate material.

5. The vehicle suspension according to claim 1, wherein the second engaging parts are provided to a position to overlap with the spring receiving part from a radial direction outer side when the adjuster part is viewed from a radial direction outer side of the adjuster part.

6. The vehicle suspension according to claim 5, wherein the first engaging parts are provided at a position overlapping with the spring receiving part from the radial direction outer side when the adjuster part is viewed from the radial direction outer side of the adjuster part.

* * * * *